United States Patent
Kondo

(10) Patent No.: US 7,490,631 B2
(45) Date of Patent: Feb. 17, 2009

(54) INTEGRALLY FORMED FLANGED METAL PIPE AND METHOD OF MANUFACTURING THEREOF

(75) Inventor: Tetsumi Kondo, Chiyoda-ku (JP)

(73) Assignee: Nippon Steel Corporation, Tokyo (JP)

( * ) Notice: Subject to any disclaimer, the term of this patent is extended or adjusted under 35 U.S.C. 154(b) by 49 days.

(21) Appl. No.: 11/812,746

(22) Filed: Jun. 21, 2007

(65) Prior Publication Data

US 2007/0245792 A1    Oct. 25, 2007

Related U.S. Application Data

(62) Division of application No. 11/136,418, filed on May 25, 2005, now Pat. No. 7,418,850.

(30) Foreign Application Priority Data

Jun. 10, 2004    (JP) .............................. 2004-172913

(51) Int. Cl.
F16L 11/00 (2006.01)
F16L 23/00 (2006.01)

(52) U.S. Cl. ...................... 138/109; 138/177; 138/155; 285/405

(58) Field of Classification Search .................. 138/109, 138/177, 155; 285/405
See application file for complete search history.

(56) References Cited

U.S. PATENT DOCUMENTS

| | | | |
|---|---|---|---|
| 2,469,775 A | 5/1949 | Lohmann | |
| 2,837,354 A * | 6/1958 | Thibault et al. | 285/222.4 |
| 3,995,663 A * | 12/1976 | Perry | 138/38 |
| 4,120,175 A * | 10/1978 | Dernedde | 464/93 |
| 5,235,839 A | 8/1993 | Lee, Jr. et al. | |
| 5,355,722 A | 10/1994 | Socier | |
| 5,358,013 A * | 10/1994 | McClain | 138/109 |
| 5,368,669 A * | 11/1994 | Maine et al. | 156/158 |
| 5,413,146 A * | 5/1995 | Kuroda et al. | 138/104 |
| 5,501,093 A | 3/1996 | Paakkunainen | |
| 5,603,533 A * | 2/1997 | Hayashi | 285/334.2 |
| 5,622,071 A | 4/1997 | Van Riper et al. | |
| 6,283,157 B1 * | 9/2001 | Rocheleau | 138/109 |
| 6,910,506 B2 * | 6/2005 | Gabriel et al. | 138/114 |

(Continued)

FOREIGN PATENT DOCUMENTS

JP    07-151277 A    6/1995

(Continued)

*Primary Examiner*—Patrick F Brinson
(74) *Attorney, Agent, or Firm*—Birch, Stewart, Kolasch & Birch, LLP

(57) ABSTRACT

A flanged pipe includes a pipe body portion, a flange portion and a bent portion located between the pipe body portion and the flange portion. The pipe body portion, the bent portion and the flange portion are formed from an integral, monolithic structure. A minimum inner diameter of the bent portion is smaller than an inner diameter of the pipe body portion. The flange portion has a first part having a thickness that is thicker than a thickness of the pipe body portion and a second part having a thickness that is thinner than the thickness of the pipe body portion. The flanged pipe has sufficient rigidity, strength and durability to attach the flange portion to other members or structures using a bolt through a hole formed in the flange portion.

22 Claims, 14 Drawing Sheets

U.S. PATENT DOCUMENTS 7,104,068 B2 * 9/2006 Moraes .................. 60/752

FOREIGN PATENT DOCUMENTS

| | | |
|---|---|---|
| JP | 09-053772 A | 2/1997 |
| JP | 10-146623 A | 6/1998 |
| JP | 10-185023 A | 7/1998 |
| JP | 10-292370 A | 11/1998 |
| JP | 11-248064 A | 9/1999 |
| JP | 200-130650 A | 5/2000 |
| JP | 2000-283357 A | 10/2000 |
| JP | 2001-205367 A | 7/2001 |
| JP | 2002-048275 A | 2/2002 |
| JP | 2002-105954 A | 4/2002 |
| JP | 2002-220830 A | 8/2002 |
| JP | 2003-293365 A | 10/2003 |

* cited by examiner

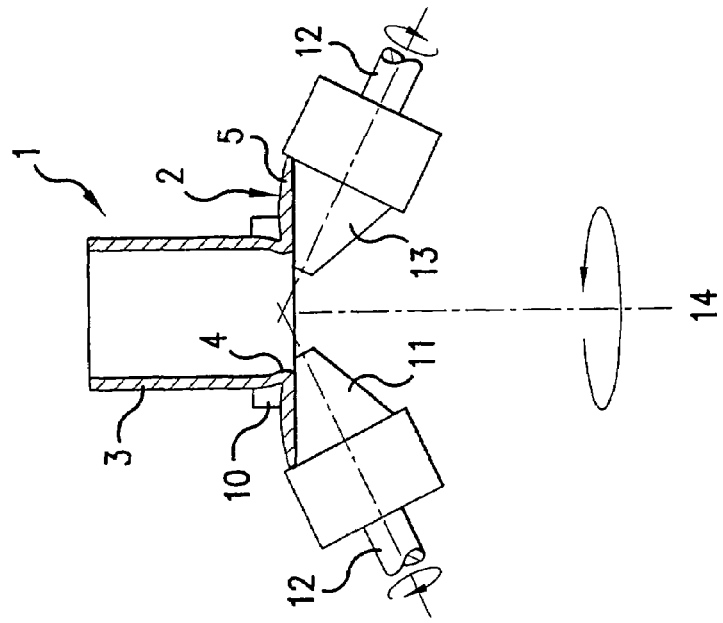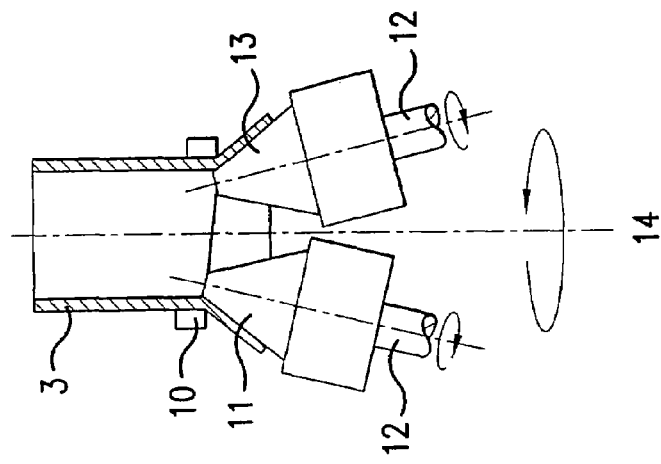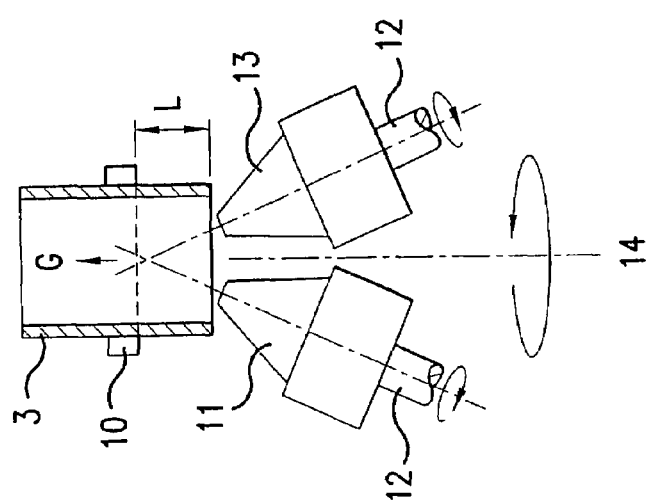

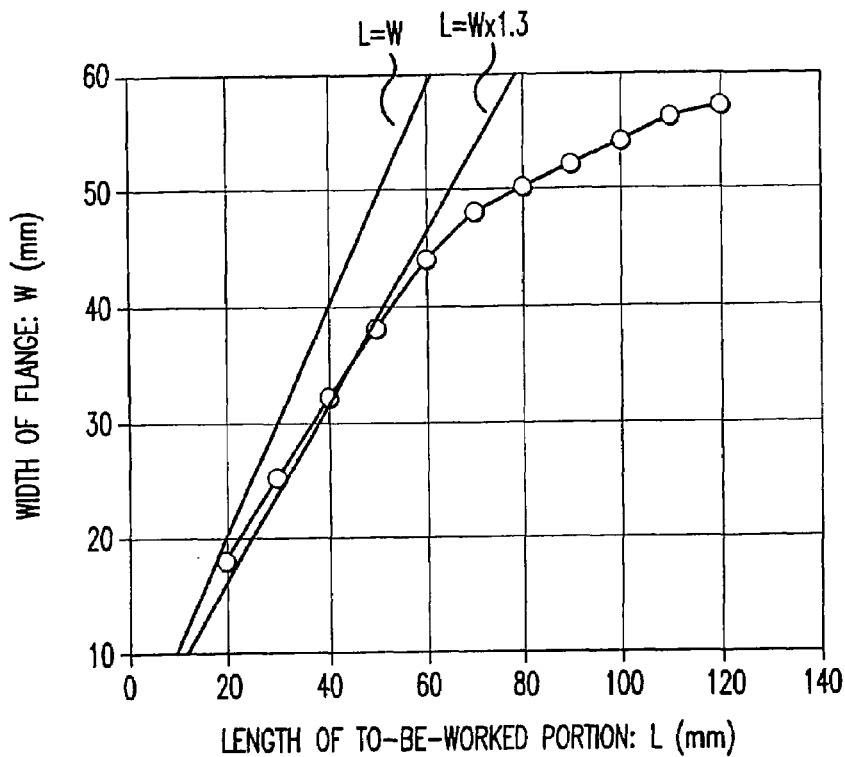
FIG.3
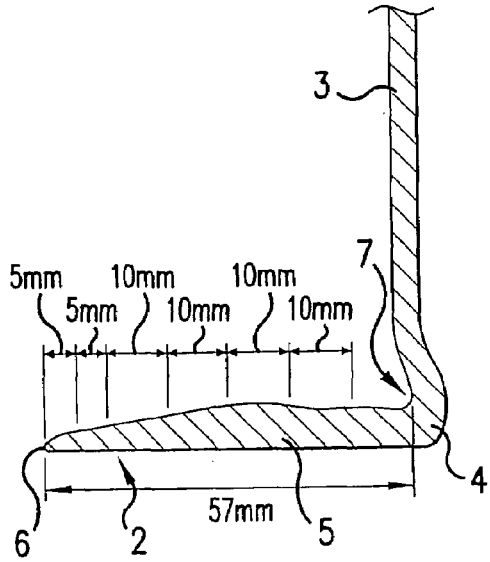
FIG.4a
| POSITION OF MEASUREMENT | THICKNESS (mm) |
|---|---|
| METAL PIPE BODY | 4.49 |
| INNER END OF FLANGE | 6.40 |
| 50mm FROM OUTER END OF FLANGE | 6.44 |
| 40mm FROM OUTER END OF FLANGE | 6.57 |
| 30mm FROM OUTER END OF FLANGE | 7.10 |
| 20mm FROM OUTER END OF FLANGE | 5.53 |
| 10mm FROM OUTER END OF FLANGE | 3.93 |
| 5mm FROM OUTER END OF FLANGE | 3.32 |
FIG.4b

MEASUREMENT RESULT: VICKERS HARDNESS

| POSITION OF MEASUREMENT | STK400 | | SGP | |
|---|---|---|---|---|
| | OUTER SURFACE | INNER SURFACE | OUTER SURFACE | INNER SURFACE |
| METAL PIPE BODY | 162 | 167 | 115 | 113 |
| FLANGE INNERMOST REGION (2) | 231 | 180 | 225 | 223 |
| FLANGE MIDPOINT REGION (3) | 188 | 211 | 182 | 198 |
| FLANGE OUTERMOST REGION (4) | 190 | 228 | 194 | 222 |

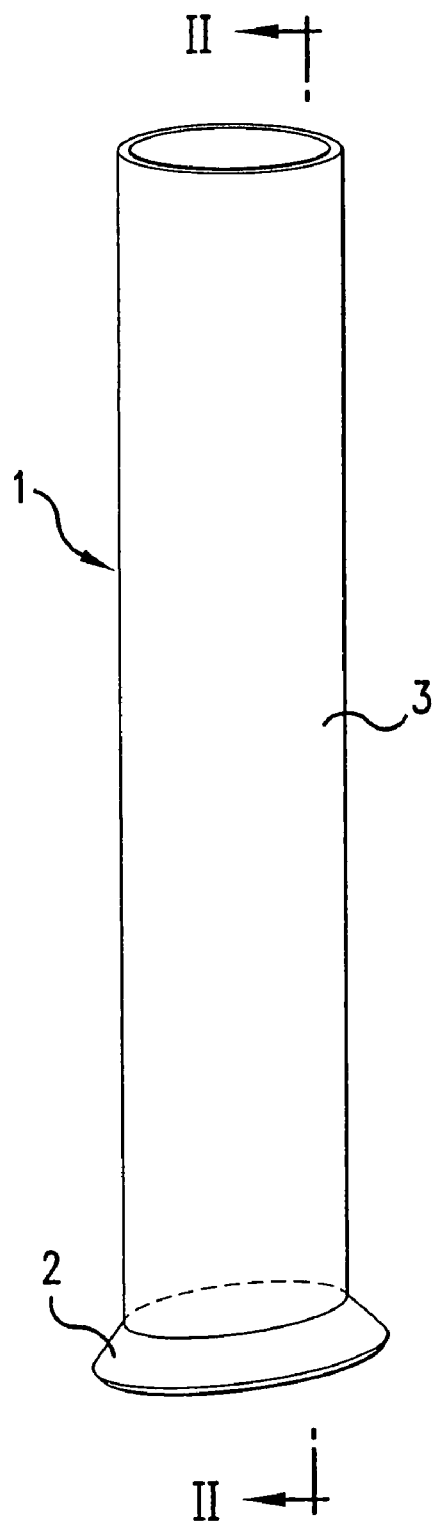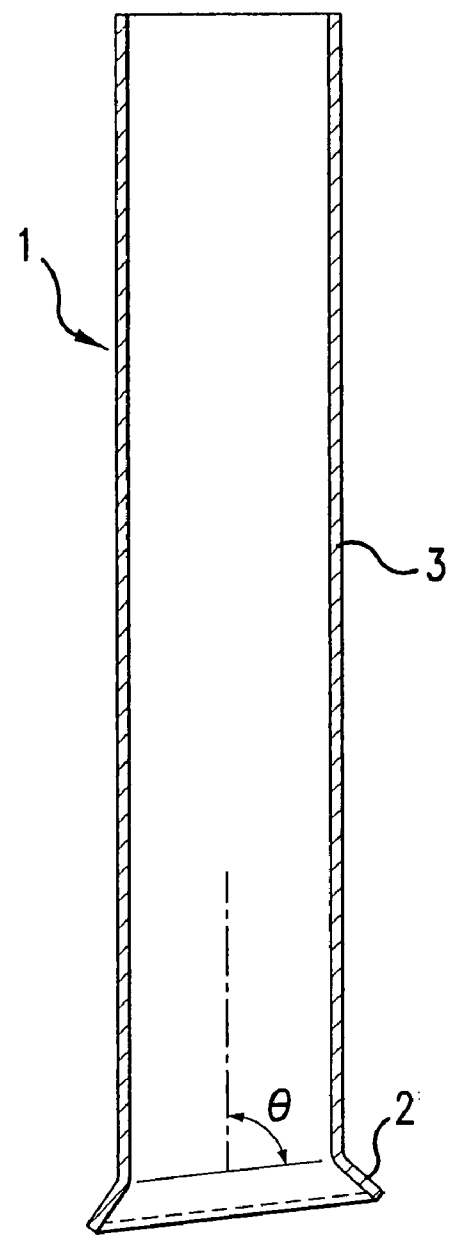
FIG.9a
FIG.9b

INTEGRALLY FORMED FLANGED METAL PIPE AND METHOD OF MANUFACTURING THEREOF

CROSS-REFERENCE TO RELATED APPLICATIONS

This application is a Divisional of application Ser. No. 11/136,418, filed on May 25, 2005, now U.S. Pat. No. 7,418,850 and for which priority is claimed under 35 U.S.C. § 120; and this application claims priority of Application No. 2004-172913 filed in Japan on Jun. 10, 2004 under 35 U.S.C. § 119; the entire contents of all are hereby incorporated by reference.

BACKGROUND OF THE INVENTION

1. Field of the Invention

The present invention relates to a flanged metal pipe (a metal pipe with a flange at an end thereof) and a manufacturing method thereof. In particular, the present invention relates to a flanged metal pipe that is excellent in rigidity, strength and durability, and a manufacturing method thereof.

2. Description of Background Art

It is rather unusual to use a simple tubular metal pipe structure for building materials such as metal pipe poles, for construction materials such as rotary press-in metal pipe piles and for industrial materials such as liquid transporting pipes. Typically, for one of the purposes mentioned above, a separately made flange portion is welded to an open end of the tubular metal pipe to form a flanged metal pipe.

For example, in the case of using a flanged pipe for industrial materials such as liquid transporting pipes, the flange portion is welded to an open end of the metal pipe body and projects outwards. The flange portion is then butt-jointed to a same-shaped flange portion of another flanged metal pipe by a fastener.

In the case of using a flanged metal pipe as a metal pipe pole, the flange portion is also welded to an open end of the metal pipe body and projects outward. The flanged metal pipe can function as a metal pipe pole by fixing the flange portion to a base plate using a bolt.

In the case of using a metal pipe as a rotary press-in metal pipe pile, a disk-shaped member is welded to an open end of the metal pipe body to form a rotary excavating blade.

In addition, a method of continuously forming a flange portion at an end of a metal pipe as an extended portion of the pipe by rolling an open end portion of the metal pipe using a cone-shaped roll is known. In such a flanged metal pipe, the flange portion is a plastically deformed disk-shaped or truncated-cone-shaped portion at the end of the metal pipe, which is continuously formed by cold working (rolling) to an open end portion of the metal pipe.

However, the metal pipe according to the background art has been previously subjected to a special pre-processing to increase a thickness of an open end portion by hot working (rolling). In addition, in the background art, a metal pipe having a continuously formed flange portion has not been used without using a separate fastening device. Furthermore, a metal pipe having a continuously formed flange portion has not been used as a metal pipe pole by fixing the flange portion to a base plate using a bolt. In other words, in the background art, it is not known to use a metal pipe having a continuously formed flange portion by a cold rolling process as a conventional flange that has a bolt hole to allow a bolt to fix the flanged pipe to other members.

A flanged metal pipe obtained by forming an open end portion of the metal pipe into a disk-shaped flange or a truncated-cone-shaped flange in a cold rolling process are not known to be used as a flange portion to be fixed to other members or structures using a bolt through the hole formed in the flange. The reason why such a metal pipe is not used in the above manner is that a flange portion of the flanged metal pipe is insufficient in rigidity, strength and durability to be fixed to other members or structures by a bolt through the hole formed in the flange portion.

SUMMARY OF THE INVENTION

An object of the present invention is to provide a flanged pipe where the flange portion and the metal pipe portion are formed from an integral, monolithic structure, wherein the flanged pipe has sufficient rigidity, strength and durability to attach the flange portion to other members or structures using a bolt through a hole formed in the flange portion. The flange portion of the present invention refers to a disk-shaped or truncated-cone-shaped portion at the end of the metal pipe, which is continuously formed by cold working (rolling) an open end portion of the metal pipe. In other words, the flange portion is a plastically deformed portion and the flange portion and the metal pipe portion are formed from an integral, monolithic structure.

The integral flange portion and metal pipe portion that are formed from an integral, monolithic structure is hereinafter referred to simply as an "integrally formed flange." A width of the flange (flange width) is a distance between the innermost end of the flange and the outer end (periphery) of the flange. The width of the flange also corresponds to a generating line of a truncated cone if the flange is truncated-cone-shaped. The inner end of the flange refers to a position located at the outer surface of a bent portion of the metal pipe, which is located between the metal pipe body and the flange. An outer diameter of the metal pipe becomes minimum at the bent portion.

According to the present invention, it is not required to weld a separately prepared flange part to a pipe body or to perform a pre-process to increase the thickness of the portion of the pipe to which the plastic cold working (rolling) is to be performed (hereinafter referred to as the "to-be-worked portion" of the pipe body).

Another objective of the present invention is to provide a flanged pipe with an integrally formed flange, which has at least one hole formed therethrough for receiving at least one bolt, so that the flange can function as a metal pipe coupling.

Another objective of the present invention is to provide a flanged metal pipe with an integrally formed flange used for a rotary press-in metal pipe pile. The flanged metal pipe is prepared by making a cut in a portion of the flange portion of the flanged pipe and then bending the flange of the portion having the cut.

The present inventor has discovered that when the integrally formed flange is formed by cold working, if a length of to-be-worked portion exceeds a certain length, an increase of worked-strain (hardening by working) is recognized. In addition, an increase of flange length is restrained to form a thick portion in the flange and a rise in hardness, yield strength and yield ratio are recognized. The above discovery has lead to the present invention to be able to provide a flanged pipe that is excellent in rigidity, strength and durability and a method for manufacturing thereof of which a summary is described below.

According to one embodiment, the present invention is directed to a flanged pipe, comprising: a pipe body portion; a flange portion; and a bent portion located between the pipe body portion and the flange portion, wherein the pipe body portion, the bent portion and the flange portion are formed from an integral, monolithic structure, a minimum inner diameter of the bent portion is smaller than an inner diameter of the pipe body portion, and the flange portion has a first part having a thickness that is thicker than a thickness of the pipe body portion and a second part having a thickness that is thinner than the thickness of the pipe body portion.

According to another embodiment, the present invention is directed to a flanged metal pipe comprising: a metal pipe body portion; a flange portion; and a bent portion located between the metal pipe body portion and the flange portion, wherein the metal pipe body portion, the bent portion and the flange portion are formed from an integral, monolithic structure, a minimum inner diameter of the bent portion is 0.7 to 0.95 times an inner diameter of the metal pipe body portion, the flange portion has a first part having a thickness that is thicker than a thickness of the metal pipe body portion and a second part having a thickness that is thinner than the thickness of the metal pipe body portion, a maximum thickness of the flange portion is 1.15 to 2 times the thickness of the metal pipe body portion; and a maximum hardness of a top surface of the flange portion is 1.15 to 2 times a hardness of an outer surface of the metal pipe body portion.

According to a method of the present invention, a method of manufacturing a flanged metal pipe, comprises the steps of: working an open end portion of a metal pipe body with at least one roller; and expanding the metal pipe body by the working to form a flange portion and a bent portion, wherein a length of a to-be-worked portion of the open end portion of the metal pipe body is 1.3 to 2.7 times a width of the flange portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2(a), 2(b) and 2(c) are illustrations showing a process for manufacturing a flanged metal pipe of the present invention by cold working (rolling);

FIG. 3 illustrates a relationship between a length of a to-be-worked portion of a metal pipe body and a flange width;

FIG. 4(a) is a schematic view describing where a thickness of a flanged metal pipe of the present invention is measured;

FIG. 4(b) illustrates a result of the measurement of the thickness of a flanged metal pipe of the present invention;

FIG. 9(a) is an elevational view showing a tilted flange portion of a flanged metal pipe of the present invention;

FIG. 9(b) is a longitudinal sectional view taken on the line II-II of FIG. 9(a);

FIGS. 15(a)-1(c) illustrates more preferable examples of how to form a blade when a flange portion of a flanged metal pipe of the present invention is used as a metal pipe pile.

DETAILED DESCRIPTION OF THE INVENTION

Figure 1:
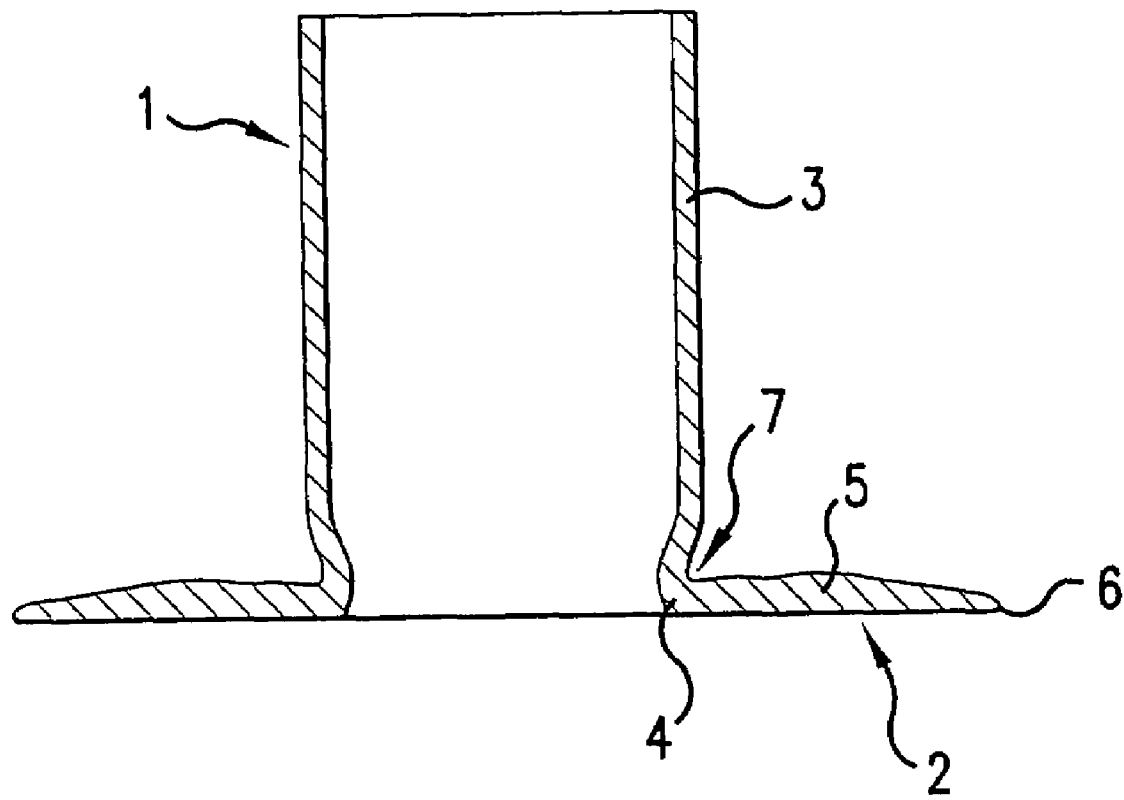
FIG. 1 is a longitudinal sectional view of a flanged metal pipe of the present invention.

The present invention is more specifically set forth in the following description with reference to the appended figures. A metal pipe body used for the present invention can be selected from electric resistance-welded pipes, butt-welded pipes and seamless pipes. It should also be mentioned that the metal pipe body according to the present invention is preferably made of steel; however, other metal materials could be used as well.

A method of the present invention for manufacturing a flanged metal pipe, having an integrally formed disk-shaped or truncated-cone-shaped flange at least at one open end thereof will be described with reference to FIG. 2.

A metal pipe body 3 is cold worked (rolled) using cone-shaped rollers 11 and 13 to form a disc-shaped flange 2. To begin with, a metal pipe body 3 is held by a holding device 10 so that a to-be-worked portion L of the metal pipe body can be cold worked (rolled) by a roller as shown in FIG. 2(a). The pair of cone-shaped working rollers 11 and 13 are inserted into an open end of the metal pipe body 3. Each of the cone-shaped working rollers 11 and 13 can be rotated around a supporting shaft 12 that is co-axial with an axis of the cone-shaped working rollers. Furthermore, each of the cone-shaped working rollers 11 and 13 can be rotated around an axis 14 of the metal pipe body 3 and can also be advanced in the G direction (in the pipe axis direction) in the drawing from the open end of the metal pipe body 3 to the to-be-worked portion L inside the metal pipe body 3. As the cone-shaped working rollers 11 and 13 advance in the G direction from the open end of the metal pipe body 3 to the to-be-worked portion L, they are rotated about their own axes (axes of the supporting shafts 12) and the metal pipe body axis 14. The open end (leading portion) of the metal pipe body 3 is gradually expanded outwards to form a truncated cone as shown in FIG. 2(*b*). As the angle formed between the metal pipe body axis 14 and each of supporting shafts 12 is gradually increased while the working rollers are about their own axes and the metal pipe body axis 14, the open end of the metal pipe body 3 flares more. Finally, a disk-shaped flange 2 is formed at the end of metal pipe body 3 by tilting the supporting shaft of the working roller to the extent that a surface of each of the pair of cone-shaped working rollers 11 and 13 becomes horizontal as shown in FIG. 2(*c*) to form a flanged metal pipe 1.

It should be noted that it is possible to perform all the process described above, i.e., rotating the cone-shaped working rollers 11 and 13 about their own axes and the metal pipe body axis 14, advancing the cone-shaped rollers 11 and 13 in the direction G and gradually increasing the angle formed between the metal pipe body axis 14 and the supporting shaft 12 of each of the cone-shaped working rollers 11 and 13, simultaneously so that the open end of the metal pipe body 3 is able to flare to form the disc-shaped flange 2.

However, it is also possible that after completion of the process shown in FIG. 2(*b*), the pair of cone-shaped working rollers 11 and 13 are backed up, and then each of the supporting shafts 12 of the cone-shaped working rollers 11 and 13 are tilted so as to make each upper surface of the cone shaped working rollers 11 and 213 face the pipe perpendicular to the metal pipe body axis 14. Then, each upper surface of the cone-shaped working rollers 11 and 13 is pressed on the open end portion of the truncated cone formed on the open end of the metal pipe body 3 while the cone-shaped working rollers are rotated about their own axes the metal pipe body axis 14 to eventually form the disk-shaped flange 2.

With regard to the arrangement and the number of the cone-shaped working rollers 11 and 13, there are no specific limitations. For example, a pair of cone-shaped working rollers 11 and 13 can be arranged so as to be symmetrical about the metal pipe body axis 14, or more than two cone-shaped working rollers can be used. However, it is usually preferable to use four working rollers so that an angle formed between two adjacent supporting shafts 12 of the cone-shaped working rollers is the same.

A flanged metal pipe 1, having an integrally formed disc-shaped (FIG. 2(*c*)) or truncated-cone shaped (FIG. 2(*b*)) flange at least at one open end of the metal pipe body 3 will be described below.

Eleven different flanged metal pipes having an integrally formed flange were prepared, where a length of the to-be-worked portion L of a metal pipe body 3 ranged from 20 mm to 120 mm. FIG. 1 illustrates a longitudinal sectional view of the prepared flanged metal pipe 1. A metal pipe that complies with STK400 of JIS G 3444 (STK400 steel pipe) was used. The metal pipe body 3 is about 4.5 mm in thickness and about 114.3 mm in outer diameter. A flange width of the eleven prepared flanged pipes ranges from 18 mm to 57 mm.

The eleven flanged metal pipes were investigated with respect to a relationship between a length of the to-be-worked portion L of the metal pipe body 3 and a flange width W of the flange 2 of the flanged metal pipe 1. The length of the to-be-worked portion L of the metal pipe body 3 and the flange width W of the flange 2 were measured using a slide caliper.

FIG. 3 illustrates the relationship between the length of the to-be-worked portion L of the metal pipe body 3 and the flange width W of the flange 2 formed by cold working. FIG. 3 illustrates that where cold working forms an integrally formed flange 2, a flange width W of the flange 2 is shorter than a length of the to-be-worked portion L of the metal pipe body 3. In the region where the length of the to-be-worked portion L is equal to or more than 60 mm and/or the flange width W is equal to or more than 40 mm, the slope of the curve decreases, indicating that the relationship between L and W becomes mild. This shows that an increase of the flange width W becomes more difficult to attain in this region.

A thickness of the flange having a width is 57 mm is measured. A schematic half sectional view of the measured flange is shown in FIG. 4(*a*). The thickness of the flange is measured using a micrometer at 8 positions. Specifically, the thickness of the flange is measured at: (1) the metal pipe body 3; (2) the radial inner end of the flange 2 (flange inner end 7); (3) 5 mm inward from the radial outer end of the flange 2 (flange outer end 6); (4) 10 mm inward from the flange outer end 6; (5) 20 mm inward from the flange outer end 6; (6) 30 mm inward from the flange outer end 6; (7) 40 mm inward from the flange outer end 6; and (8) 50 mm inward from the flange outer end 6.

Figure 5:
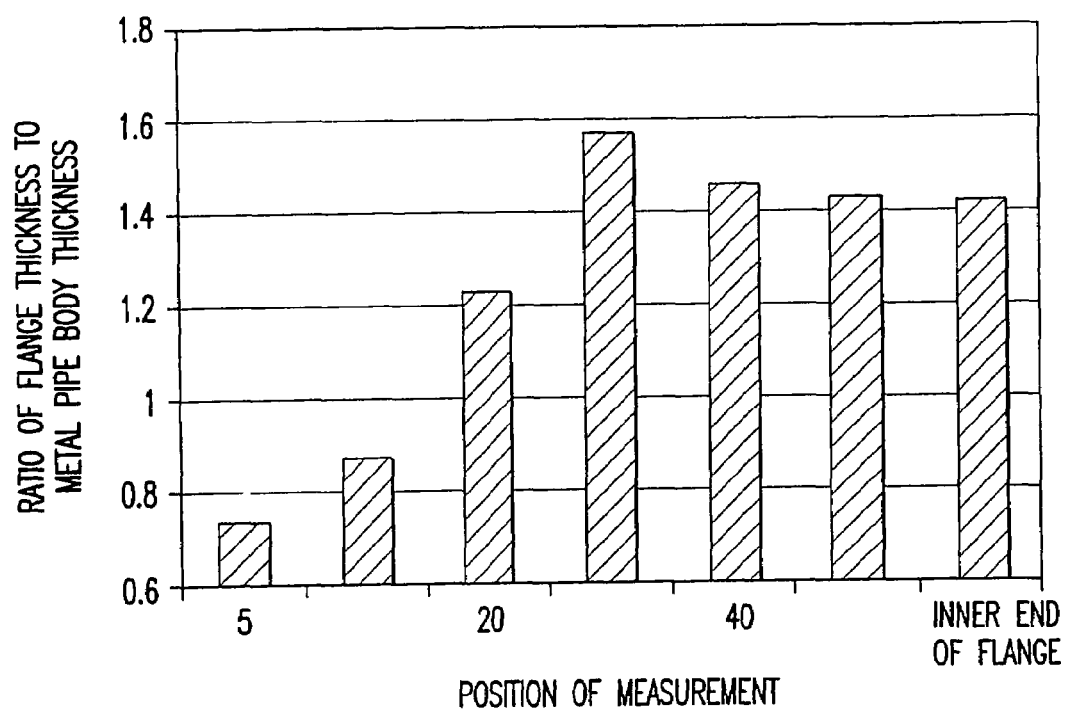
FIG. 5 illustrates a relationship between a measured position and a ratio of (flange thickness)/(metal pipe body thickness)

FIG. 4(*b*) shows the results of measuring the thickness and FIG. 5 shows a relationship between a measured position and a ratio of (flange thickness)/(metal pipe body thickness). The flange thickness becomes a maximum at the position 30 mm inward from the flange outer end 6, i.e., about at a midpoint between the flange outer end 6 and the flange inner end 7 (flange midpoint 5). At the position 10 mm inward from the flange outer end 6, the thickness is thinner than the thickness of metal pipe body 3.

In view of the results described above, it is found that when forming the integrally formed flange by cold working, in the region where the length of the to-be-worked portion L is equal to or more than 60 mm and/or the flange width W is equal to or more than 40 mm, particularly in the region where the flange width W is more than about 45 mm, an increase of the flange width W is significantly restrained. In addition, the flange 2 has a thicker portion and a thinner portion that are respectively thicker and thinner than the thickness of the metal pipe body 3 and the increase of thickness (t) in the radial midpoint region is significant. In other words, the increase of thickness (t) in the radial midpoint region becomes significant when the (length of the to-be-worked portion L)>(the flange width W)×1.3.

Furthermore, a flanged metal pipe 1 having an integrally formed flange 2 that has a width of 60 mm was prepared by cold working using the above-mentioned cone-shaped working rollers 11 and 13 to an open end of an STK400 metal pipe body 3 and a SGP100A metal pipe body 3. The SGP100A metal pipe body corresponds to a steel pipe body formed in accordance with SGP100A of JIS G 3452. Both the STK400 steel pipe and the SGP100A steel pipe have the same thickness (4.5 mm) and the same diameter (114.3 mm) in the metal pipe body 3. A schematic view of the prepared flanged pipe is shown in FIG. 6(*a*), where details of the flange thickness are not shown.

The Vickers hardness was measured according to JIS Z 2244 with respect to both the outer surface and the inner surface of the metal pipe body 3, flange inner end 7, flange midpoint 5 and flange outer end 6. The outer surface of the flange 2 corresponds to an outer surface of the original metal pipe body 3 (metal pipe body before being cold worked), which is also an upper (top) surface of the flange 2. The inner surface of the flange 2 corresponds to an inner surface of the original metal pipe body 3, which is also a lower (bottom) surface of the flange 2.

The Vickers hardness of the flange portion was measured at the following regions: (1) an outermost region 10 mm inward from the flange outer end 6; (2) an innermost region 10 mm outward from the flange inner end 7; and (3) a midpoint region having a 10 mm radial width including the flange midpoint 5 in the center thereof. The Vickers hardness of the metal pipe body 3 was measured at a position more than 30 mm away from a bottom surface of the flange 2 in the pipe longitudinal direction.

Figures 6A, 6B:
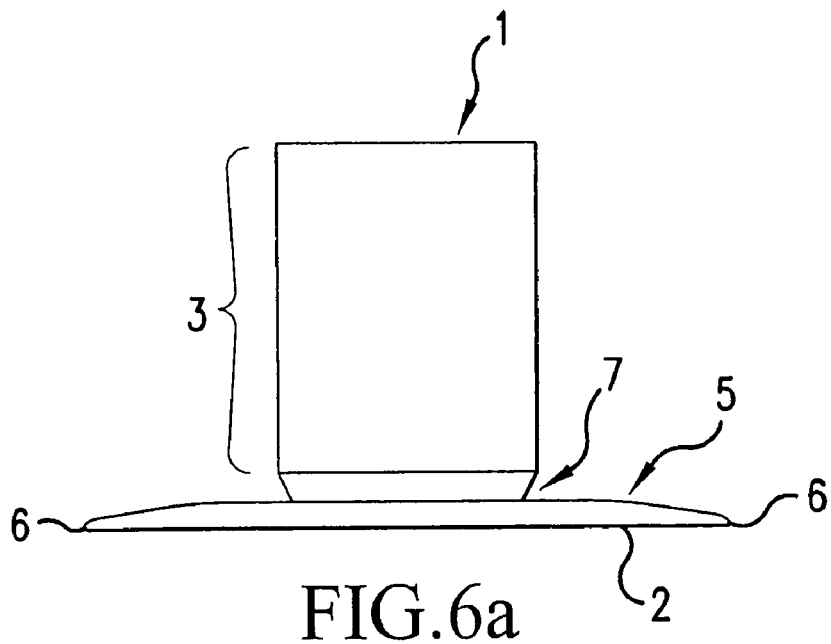
FIG. 6(a) is a schematic view describing positions of measuring the Vickers hardness of a flanged metal pipe of the present invention.
FIG. 6(b) illustrates a result of the measurement of Vickers hardness of a flanged metal pipe of the present invention.
Figure 7:
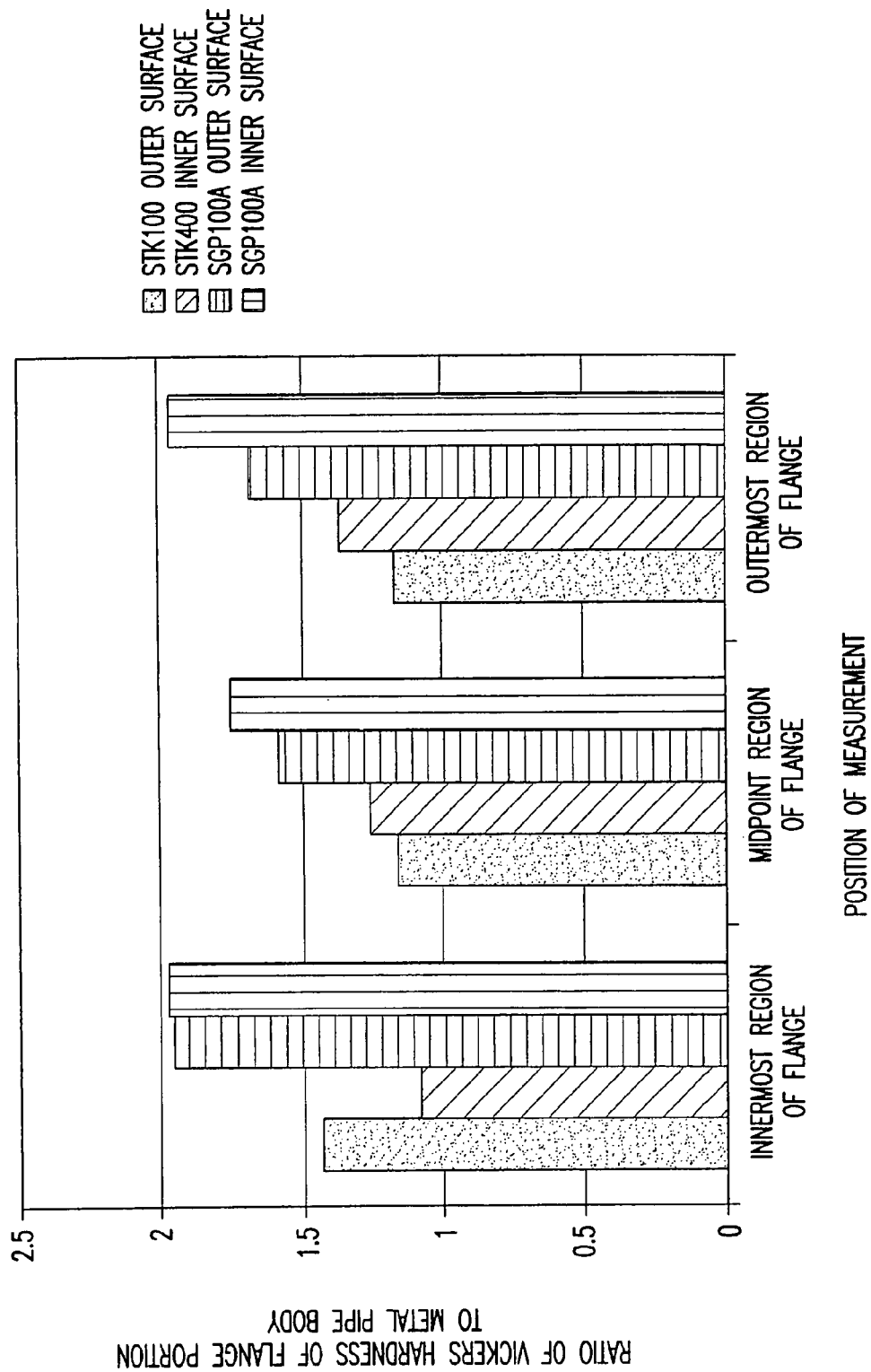
FIG. 7 illustrates a flange hardness ratio of a flanged metal pipe of the present invention, i.e., (Vickers hardness value of the flange portion)/(Vickers hardness value of the metal pipe body)

FIG. 6(b) illustrates a result of the Vickers hardness measurement. FIG. 7 illustrates a relationship between a type of metal pipe and a measuring position and a ratio of the Vickers hardness of the flange 2 to the Vickers hardness of the metal pipe body 3, i.e., (Vickers hardness value of the flange portion)/(Vickers hardness value of the metal pipe body), which is referred to as a flange hardness ratio.

According to FIG. 7, it is found that in the case of forming the integrally formed flange 2 by cold working, in the region where the length of the to-be-worked portion L is equal to or more than 60 mm and a flange width W is equal to or more than 40 mm, particularly in the region where the flange width is more than about 45 mm, an increase of the flange width W is significantly restrained. In addition, the flange 2 has a thicker portion and a thinner portion that are respectively thicker and thinner than the thickness of the metal pipe body 3. Furthermore, the increase of thickness (t) in the radial midpoint region is significant. Finally, the flange hardness ratio becomes more than 1.0 over the whole flange due to hardening by cold working. In other words, it is found that in the case where the following condition is met, (length of the to-be-worked portion L)>(flange width W)×1.3, the increase of thickness (t) in the radial midpoint region is significant and the flange surface hardness becomes higher than that of the metal pipe body 3.

The flange hardness ratio of the flanged metal pipe 1 made from an SGP100A steel pipe is larger than that of the flanged steel pipe made from STK400, which indicates that the softer the material of the original steel pipe is, the more significant the hardening by cold working is. This leads to a higher flange hardness ratio.

When a flanged metal pipe is manufactured by cold working to an open end portion of a metal pipe body so that the length of the to-be-worked portion L becomes equal to or more than 60 mm, the flange width W becomes equal to or more than 40 mm, particularly the flange width W becomes more than about 45 mm, or the following condition is met, (length of the to-be-worked portion L)>(flange width W)×1.3, the manufactured flanged metal pipe can be excellent in rigidity, strength and durability. Consequently, it becomes possible to joint the flange portion to another flange portion or a base plate by using bolts through holes formed in the flange portion of the manufactured flanged metal pipe.

The manufactured flanged metal pipe 1 has a flange 2, which has a portion that is thicker than the thickness of metal pipe body 3. The manufactured flanged metal pipe 1 also has an excellent hardness and yield ratio as described above. It was also found that this flanged metal pipe is featured by its shape. Specifically, as indicated in FIG. 1 or FIG. 4, the flanged metal pipe 1 has a constricted part at a bent portion 4 that bridges the metal pipe body 3 and the flange 2. At this location, the minimum inner diameter is smaller than the inner diameter of the metal pipe body 3. In a region that is 20 mm or less away from the bottom surface of the flange 2, the outer and inner diameters of the flanged metal pipe 1 are narrower than those of the metal pipe body 3, respectively.

The reason why the integrally formed flanged metal pipe 1 made in the manner described above has a portion thicker than the thickness of metal pipe body 3 is due to the binding that occurs in the outermost area of the flange 2 that generates a compression stress toward the inner end of the flange 2 while causing plastic deformation to the pipe body by the cold working. The compression stress due to the binding of the outermost area becomes greater as a width of the flange 2 increases. This makes the thickness of the midpoint area of the flange increase and forms a constricted part when the length of the to-be-worked portion L of the metal pipe body 3 is in a proper range.

Furthermore, the following factors or items were investigated, i.e., (maximum thickness of flange)/(thickness of metal pipe body), (minimum inner diameter of bent portion)/(inner diameter of metal pipe body), (maximum Vickers hardness of the flange)/(Vickers hardness of metal pipe body), range of flange width to ensure the sufficient rigidity and strength in the case of outer diameter of metal pipe body ranging from 60 to 400 mm, and (length of to-be-worked portion)/(flange width). The result of the investigation will now be described.

It is preferable for ratio of (maximum thickness of flange)/(thickness of metal pipe body) to be 1.15 or more, which improves rigidity and durability of the flange. The value of this ratio usually does not exceed 2. The thickness of the flange can be measured by a micrometer. The maximum thickness of the flange 2 can be determined as the thickness of the flange midpoint 5 between the flange outer end 6 and the flange inner end 7 of the flange 2 or by measuring the thickness of a plurality of points at regular distance intervals, e.g., 5.0 mm interval or 10 mm intervals.

A ratio of (the minimum inner diameter of the bent portion)/(inner diameter of metal pipe body) should preferably be between 0.95 and 0.70. This ratio means that a constricted part 7 is formed between the flange 2 and the metal pipe body 3, which makes the flanged metal pipe 1 of the present invention improved in rigidity and resistance against a large twisting or bending stress.

A ratio of (the maximum Vickers hardness of the flange portion)/(the Vickers hardness of the metal pipe body) should preferably be equal to or more than 1.15. This is an index for accomplishing a satisfactory quality and function such as durability by increasing the strength of the flange. The Vickers hardness of the flange 2 is increased by hardening through cold working during the forming of the flange 2. Therefore, the softer the material of metal pipe body is, the larger the ratio of (the maximum Vickers hardness of the flange)/(the Vickers hardness of the metal pipe body) becomes. In other words, the lower the Vickers hardness of the metal pipe body is, the higher the ratio of (the maximum Vickers hardness of the flange)/(the Vickers hardness of the metal pipe body) becomes. However the value of the ratio hardly excesses 2.

The Vickers hardness of the flange 2 was measured, according to JIS Z 2244, with respect to both the outer surface and the inner surface of the flange 2. The measurement was made at a plurality of positions, for example, at three regions as follows: (1) an outermost region 10 mm inward from the flange outer end 6; (2) an innermost region 10 mm outward from the flange inner end 7; and (3) a midpoint region having a 10 mm radial width including the flange midpoint 5 in the center thereof. Of course, the measurement can be done at more than five points. The maximum value among the measured values should be the maximum Vickers hardness of the flange.

With respect to the range of the flange width W to ensure a sufficient rigidity and strength in the case of an outer diameter of the metal pipe body ranging from 60 to 400 mm, the flange width W should be equal to or more than 40 mm, more preferably equal to or more than 45 mm. The upper limit of the flange width W is defined by a width where cracks arise at the outer end portion of the flange while cold working. This depends on the thickness and material of the metal pipe body 3. However, generally the cracks start to arise when the flange width W exceeds 120 mm. The range of the flange width W should preferably be from 45 mm to 60 mm when considering rigidity, strength and formability by cold working the flange 2.

A preferable value of the ratio of (the length of to-be-worked portion)/(the flange width) is between 1.32 and 2.7, which can make the ratio of (the maximum thickness of the flange)/(the thickness of the metal pipe body) be 1.15 or more, make the ratio of (the minimum inner diameter of the bent portion)/(the inner diameter of the metal pipe body) be between 0.95 and 0.70, and make the ratio of (the maximum Vickers hardness of the flange portion)/(the Vickers hardness of the metal pipe body) become equal to or more than 1.15. Depending on strength, thickness and outer diameter of the metal pipe body 3, the length of the to-be-worked portion L should preferably be between 70 mm and 120 mm.

A variety of examples using a flanged metal pipe 1 of the present invention will now be described.

A flanged metal pipe 1 of the present invention includes a flange 2 and an integral metal pipe body 3. The flange 2 and metal pipe body are integrally formed from a monolithic (one-piece) structure by cold working an open end of the metal pipe body 3. In other words, the flange 2 of the flanged metal pipe 1 of the present invention is not formed by welding a separately prepared member to the metal pipe body 3. The flange 2 is made directly from an open end of the metal pipe body 3. Therefore, the flange 2 has a structure formed by cold working, whereby the open end of the metal pipe body 3 is plastically deformed to form the flange 2.

Figure 8A:
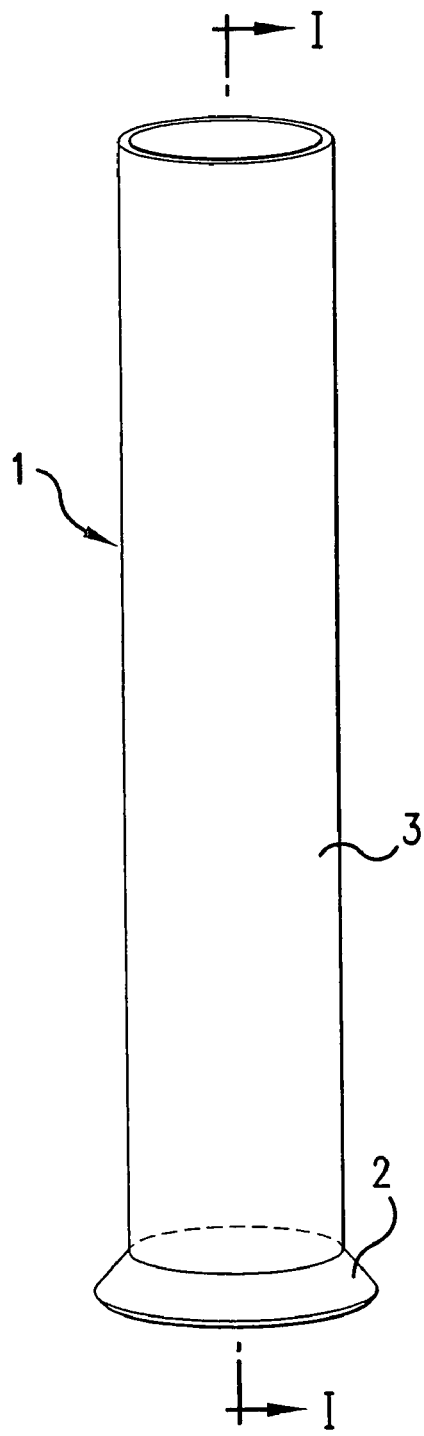
FIG. 8(a) is an elevational view showing a truncated-cone-shape flange portion of a flanged metal pipe of the present invention.
Figure 8B:
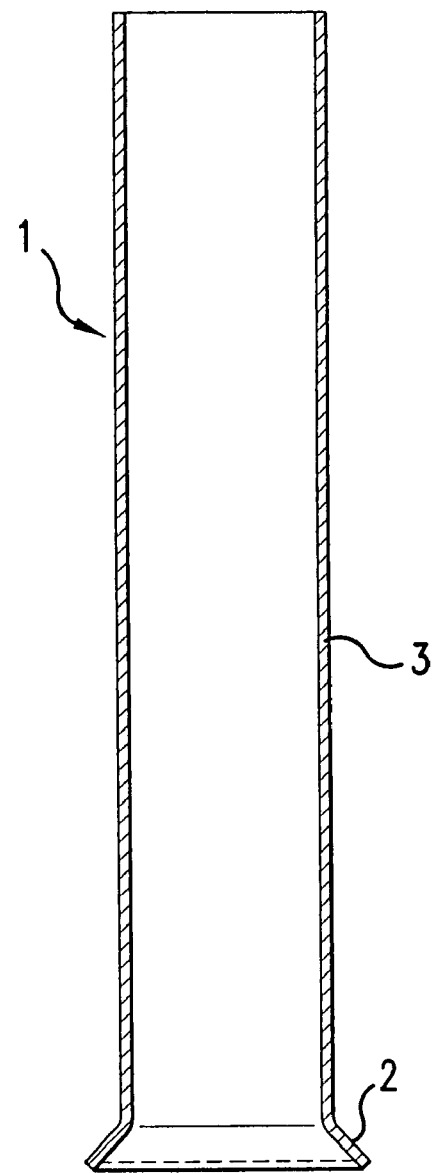
FIG. 8(b) is a longitudinal sectional view taken on the line I-I of FIG. 8(a)

It should be noted that the flange 2 of the flanged metal pipe 1 of the present invention can also have a truncated-cone shape as schematically shown in FIGS. 8(a) and 8(b) or can have a tilted, truncated-cone shape as schematically indicated by the angle θ in FIGS. 9(a) and 9(b).

Figure 10A:
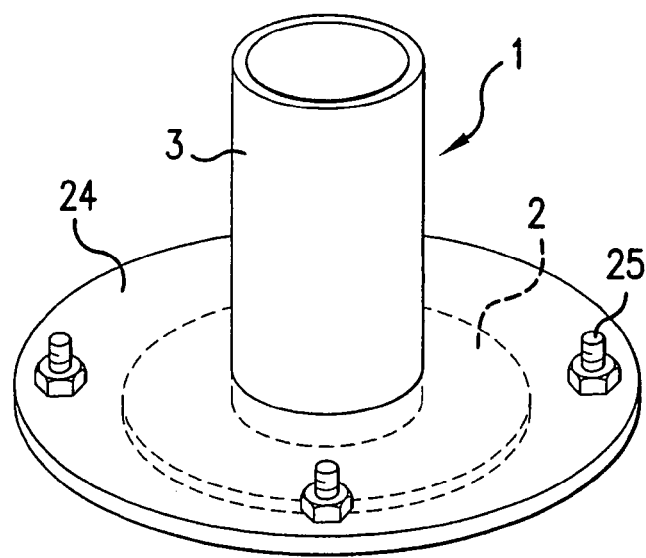
FIG. 10(a) is a perspective view indicating a way a flanged metal pipe of the present invention used as a metal pipe pole is fixed to a foundation.
Figure 10B:
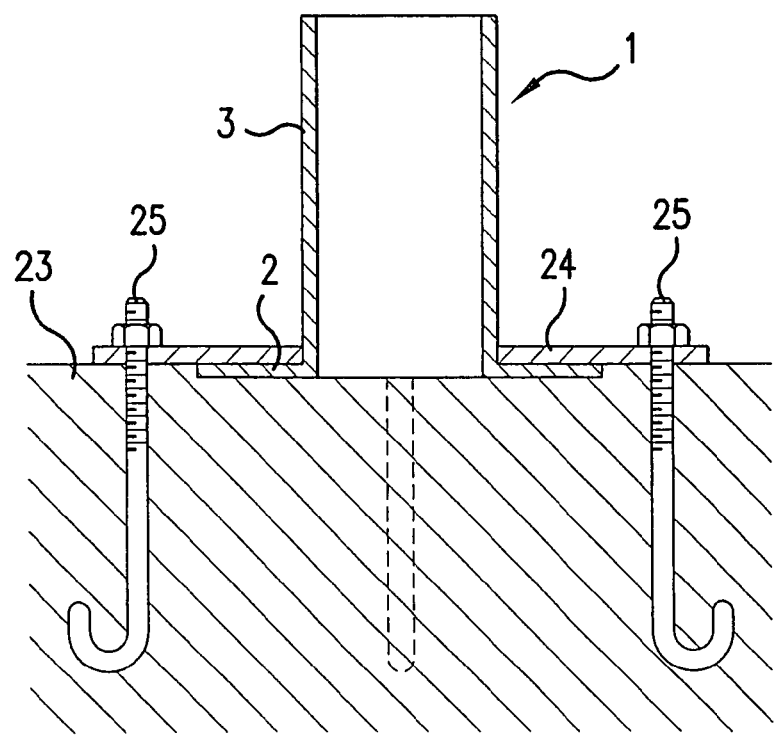
FIG. 10(b) is a sectional view indicating a way a flanged metal pipe of the present invention used as a metal pipe pole is fixed to a foundation.

As shown in FIGS. 10(a) and 10(b), a flanged metal pipe 1 of the present invention can be used as a metal pipe pole by fixing an upper surface of the flange 2 with a base plate 24. In FIG. 10(b), the base plate 24 is fixed to a foundation 23 with anchor bolts 25. The base plate 24 presses the flange 2 of the flanged metal pipe 1 to fix the metal pipe pole.

Figure 11A:
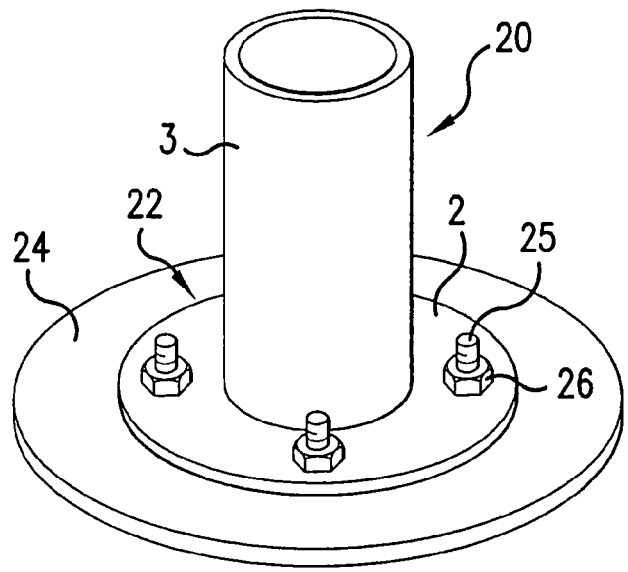
FIG. 11(a) is a perspective view indicating a way a flanged metal pipe with holes in the flange of the present invention used as a metal pipe pole is fixed to a foundation.
Figure 11B:
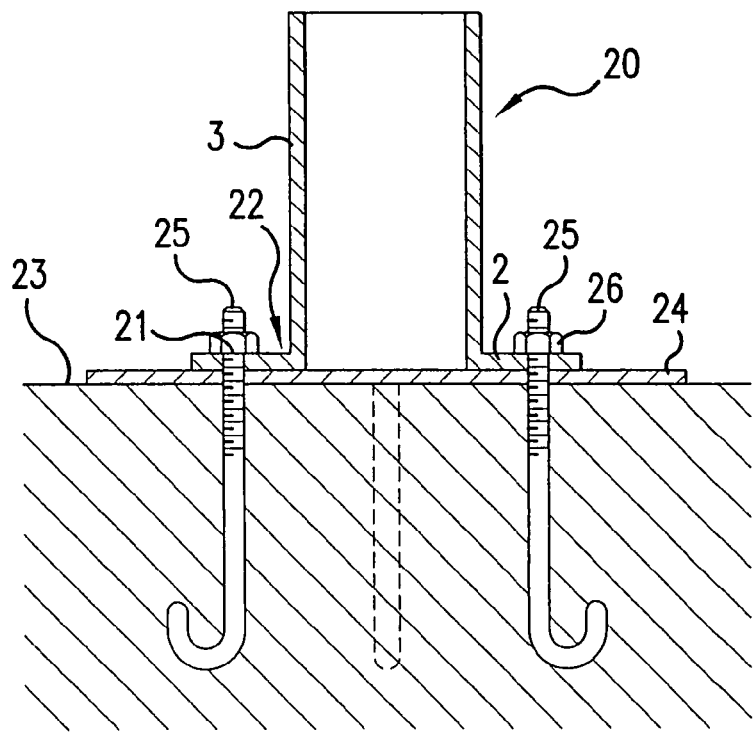
FIG. 11(b) is a sectional view indicating a way a flanged metal pipe with holes in the flange of the present invention used as a metal pipe pole is fixed to a foundation.

A flanged metal pipe of the present invention can have a strength that is sufficient enough to be jointed to other members or another flanged metal pipe by using bolts and nuts after forming a hole in the flange 2. FIG. 11(a) and FIG. 11(b) illustrate examples where a flanged metal pipe 1 of the present invention is used as a metal pipe pole 20 by forming holes in the flange 2. A bottom part 22 of the metal pipe pole 20 is a disk-shaped flange 2 which is formed by cold working an open end of a metal pipe body 3 (integrally formed flange). The disk-shaped flange 2 has a bolt-inserting hole 21 formed by machining, which functions as a fixing plate 22. The fixing plate 22 (bottom part) of the metal pipe pole 20 is placed on a base plate 24 on a foundation 23 so that an anchor bolt 25 fixed to the foundation 23 can be inserted into the bolt-inserting hole 21 of the fixing plate 22 and the base plate 24. The metal pipe pole 20 can be fixed to the foundation 23 by tightening a nut 26 and the anchor bolt 25. The fixing plate 22 is good in rigidity and is capable of firmly fixing the metal pipe pole 20 to the foundation 23 without being damaged even if a large bending force or lifting force is applied to the bottom part of the metal pipe pole 20.

It is also possible to joint a plurality of metal pipe poles 20 to each other using bolts and nuts by forming the fixing plate 22 with bolt-inserting holes 21 on both ends of each of the plurality of metal pipe poles. The metal pipe pole 20 using a flanged metal pipe 1 of the present invention is so good in strength and rigidity at the fixing plate 22 and in the vicinity thereof that swinging by the wind is small and the fatigue strength is high. The metal pipe pole using the present invention also ensures a proper right angle between the fixing plate 22 and the metal pipe body 3, which can ensure that a line of a plurality of the metal pipe poles jointed to each other using bolts very straight.

Figure 12A:
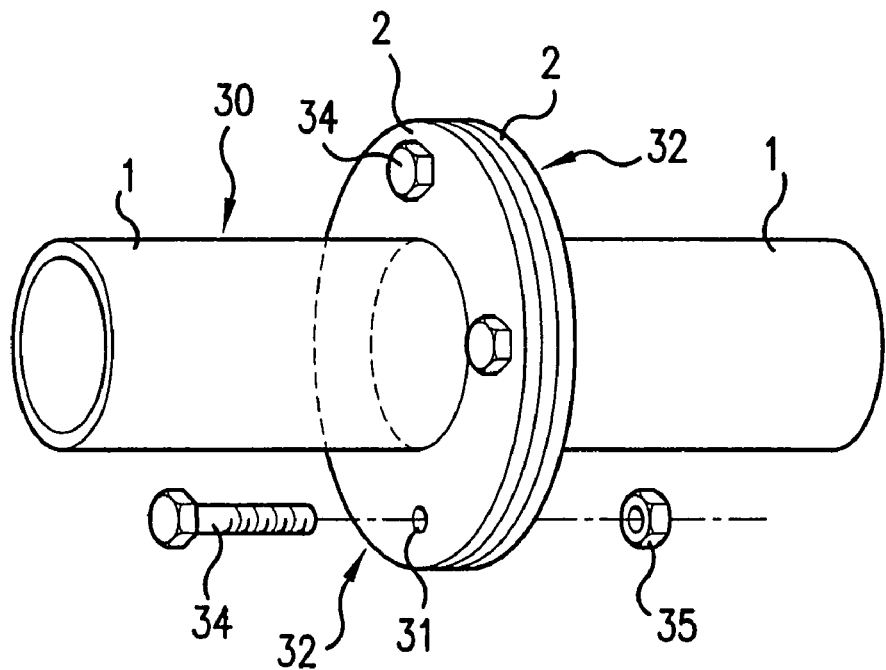
FIG. 12(a) is a perspective view indicating an example of a flange portion of a flanged metal pipe of the present invention used as a coupling device for a liquid transporting pipe.
Figure 12B:
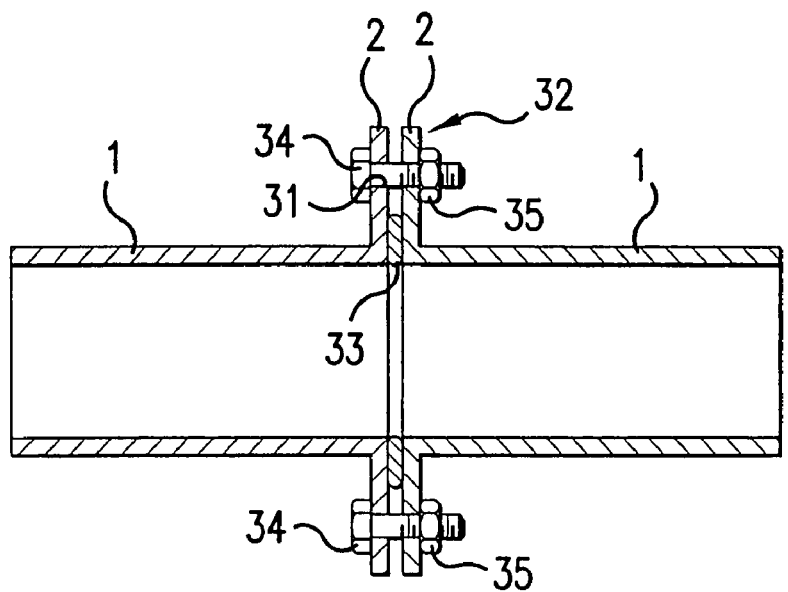
FIG. 12(b) is a sectional view indicating an example of a flange portion of a flanged metal pipe of the present invention used as a coupling device for a liquid transporting pipe.

FIGS. 12(a) and 12(b) illustrate another example of the present invention where a flanged metal pipe 1 of the present invention is used for a liquid transporting pipe 30. The liquid transporting pipe 30 has a flange 32 made by providing a bolt hole 31 to a disk-shaped flange 2 which is formed by cold working (integrally formed flange). A plurality of the liquid transporting pipes 30 with the flange 32 at both ends can be joined by coupling the flanges 2 of adjacent liquid transporting pipes 30 via packing 33 using bolts 34 and nuts 35 to form a water-tight liquid transporting pipe line.

The liquid transporting pipe using a flanged metal pipe of the present invention is so good in flange strength that the coupling part can avoid damage and leakage of liquid even if an inner pressure or an external force of an earthquake is applied. The thick flange can provide a high rigidity to the flange and the narrower outer and inner diameters of the metal pipe 3 near the flange 2 due to a constricted part can provide a good bending strength. The liquid transporting pipe using the present invention also has a precise flange shape and a precise angle between a flange plane and a longitudinal axis of the metal pipe body 3, which makes it easy to prevent liquid leakage from a coupling part jointed with bolt.

Since a flanged metal pipe 1 of the present invention has a flange 2 that is good in strength and rigidity, it is also possible to use the flanged metal pipe 1 as a metal pipe pile by making the flange 2 function as a blade fixed on the leading end of the metal pipe pile. The flange 2 can be changed into a blade by making a cut in a portion of flange 2, which runs from an outer end 6 of the flange 2 up to the bent portion 4. Then, the flange is partially bent upward and downward at both sides of the cut, respectively.

Figures 13A, 13B:
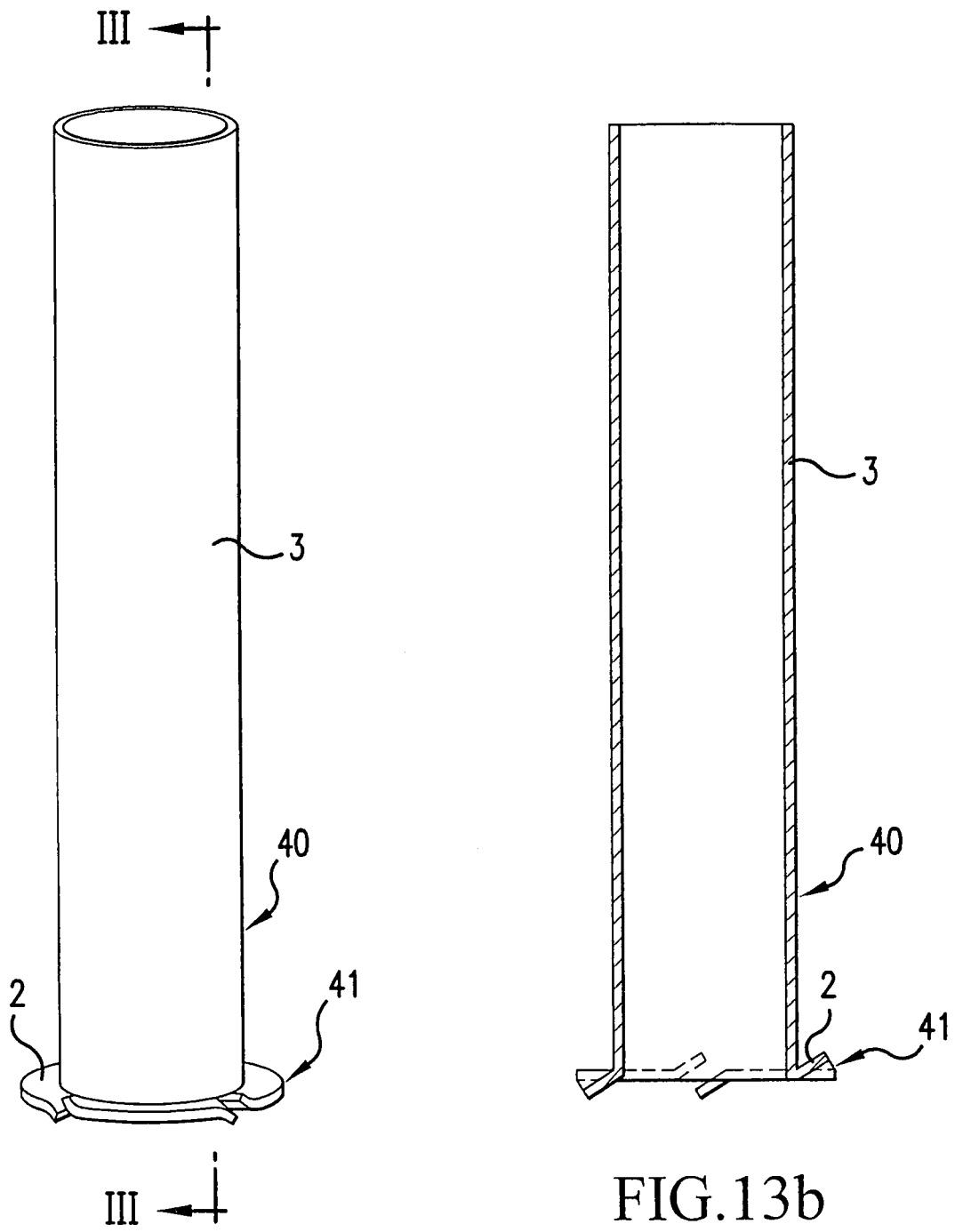
FIG. 13(a) is a perspective view illustrating an example of a flanged metal pipe of the present invention used as a metal pipe pile.
FIG. 13(b) is a longitudinal sectional view taken on the line III-III of FIG. 13(a)
Figure 14A:
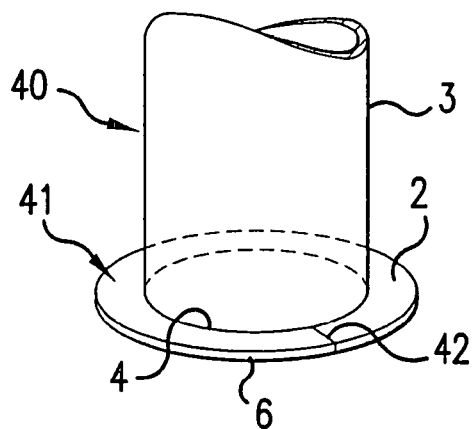
FIGS. 14(a)-14(d) are illustrations of how to form a blade for a metal pipe pile when a flange portion of a flanged metal pipe of the present invention is used as a metal pipe pile.
Figure 14B:
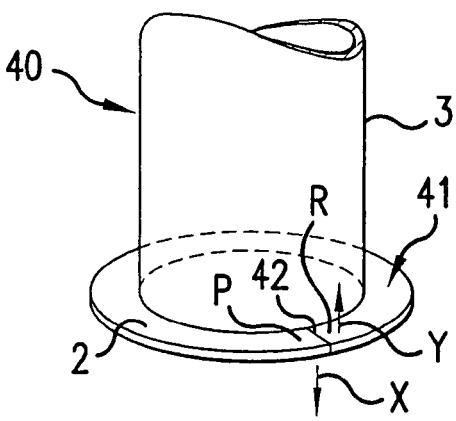
Figure 14C:
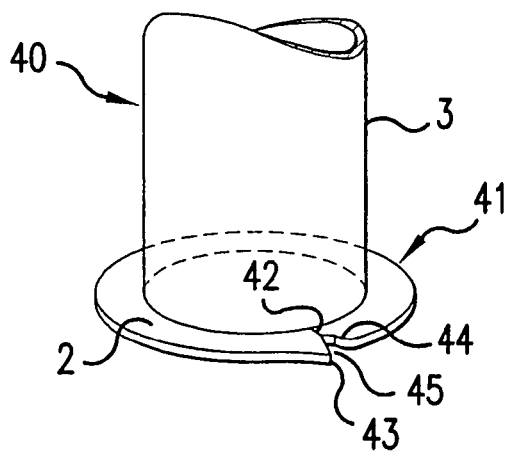
Figure 14D:
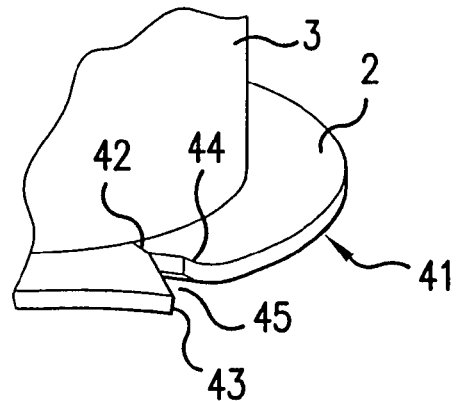

FIG. 13 is a schematic view of a modified flanged metal pipe 1 of the present invention for being used as a rotary press-in metal pipe pile 40. A flange 2 of a flanged metal pipe 1 can be changed into a blade 41 by making a cut in a portion of flange 2 and then by bending both sides of the cut upward and downward, respectively. The flange in FIG. 13 has three cuts formed therein; however, it should be understood that more or less cuts could be provided.

Figure 15A:
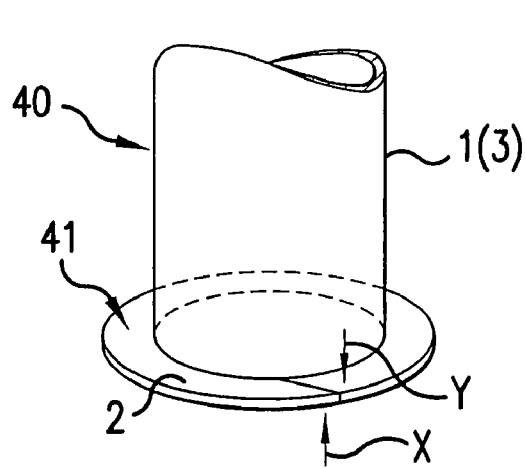
Figure 15B:
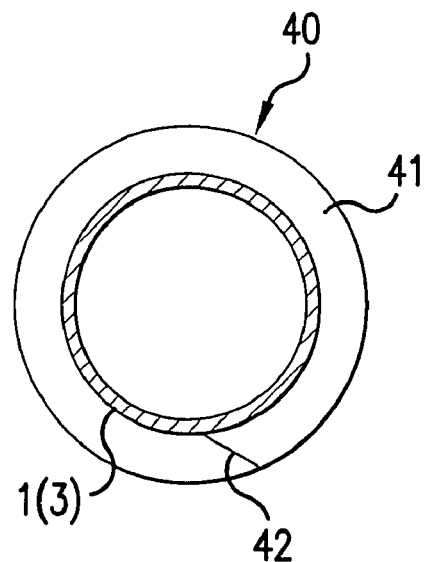
Figure 15C:
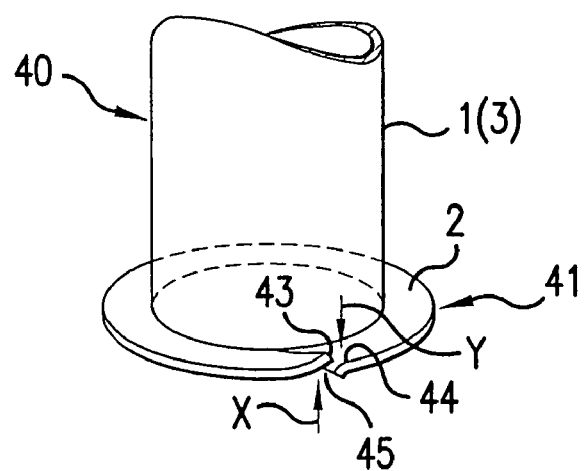

FIG. 14 illustrates the process for manufacturing the rotary press-in metal pipe pile 40. As shown in FIG. 14(a), a cut 42 that is straight, curved, V-shaped or U-shaped is formed to almost reach the bent portion 4 of the flange 2. Then, as shown in FIG. 14(b), both sides of the cut 42, i.e., leading end P and trailing end R in the rotational direction, are bent in the direction of arrow X and arrow Y, respectively, to form an excavating blade part 43 and an excavating guide part 44 of the blade 41 of the rotary press-in metal pipe pile as shown in FIG. 14(c) and FIG. 14(d). A gap 45 formed between the excavating blade part 43 and the excavating guide part 44 can facilitate the discharge of earth and sand dug by the excavating blade part 43 to an upper surface of the blade 41. Thus, the formation of an air space between the outer surface of metal pipe body and the earth and sand is effectively avoided. The leading end P of the excavating blade part 43 should preferably face inwardly in the rotational direction. Therefore, the cut 42 in the flange 2 is made to face inward in the rotational direction as shown in FIG. 15.

In the rotary press-in metal pipe pile manufactured using a flanged metal pipe 1 of the present invention, the blade is hardly deformed while being pressed into hard ground, since the blade has a high strength and rigidity. A modification of an upward angle of the blade should preferably be restrained to some extent if the performance of excavation is degraded.

A bottom surface of the blade is located outside of the metal pipe body 1. Therefore, a sliding distance in the earth and sand of the blade is longer than that of an outer surface of the metal pipe body 1, which leads to quicker abrasion. Also, a pressing pressure that the bottom surface of the blade receives from the earth and sand while excavating is much larger than the pressure that the metal pipe body 3 receives. At the beginning of excavation, the pressure that the metal pipe body 3 receives is very small. As a result, a bottom surface of the blade suffers damage from earth and sand much easier compared to a metal pipe body 3 itself. Consequently, it is very important to avoid thinning the blade due to abrasion by increasing the thickness and the Vickers hardness of the blade.

The metal pipe pile using the flanged metal pipe 1 of the present invention is very suitable for a rotary press-in metal pipe pile because the blade has a portion thicker than the thickness of the metal pipe body and a high Vickers hardness. That is, a maximum thickness of the flange 2 of the flanged metal pipe 1 of the present invention is at least 1.15 times greater than the thickness of the metal pipe body 3. Also, a maximum Vickers hardness of the blade is at least 1.15 times greater than Vickers hardness of the metal pipe body, which can significantly restrain the abrasion of the blade. Furthermore, the flanged metal pipe 1 has a constricted part at the bent portion 4, which helps increase a supporting force with respect to a load applied in a vertical direction as earth and sand which moves into the metal pipe pile is compressed at the constricted part. A width of the flange 2 should preferably be equal to or more than 50 mm when the flanged metal pipe 1 of the present invention is used for a rotary press-in metal pipe pile, since the flange is used as a blade.

If a longer metal pile is needed, another metal pipe can be additionally welded for further rotary press-in. Alternatively, in the case of using a rotary press-in metal pipe pile using a flanged metal pipe 1 of the invention, the longer pile is easily prepared if the blade is formed on both ends of the rotary press-in metal pipe pile. That is, a blade at a bottom end of another pile is simply welded or otherwise fastened to a blade at top end of currently operated pile.

A flanged metal pipe 1 of the present invention described above can also be used for other uses. For example, the metal pipe pile shown in FIG. 13 can be used as a well drilling machine.

Many modifications can be made depending on the use and purpose of the flanged metal pipe. For example, if corrosion resistance is required, plating or other coating can be applied to the metal pipe. In addition, if a good appearance is required, stainless steel pipe can be used. Titanium, aluminum, copper or other metals can also be used as a material for the pipe body.

This invention can provide a flanged metal pipe having a flange, which is integrally formed with metal pipe body, wide and excellent in rigidity, strength and durability, and method for manufacturing the flanged metal pipe. The flanged metal pipe of the invention is excellent in accuracy of shape compared to a conventional flanged pipe which is made by welding the flanged portion to a metal pipe body because the flanged metal pipe of the invention is made by applying rolling work to an open end portion of metal pipe body, and therefore has no deformation due to heat distortion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A flanged pipe, comprising:
a pipe body portion;
a flange portion; and
a bent portion located between the pipe body portion and the flange portion,
wherein the pipe body portion, the bent portion and the flange portion are formed from an integral, monolithic structure, a minimum inner diameter of the bent portion is smaller than an inner diameter of the pipe body portion, and the flange portion has a first part having a thickness that is thicker than a thickness of the pipe body portion and a second part having a thickness that is thinner than the thickness of the pipe body portion.

2. The flanged pipe according to claim 1, wherein a maximum thickness of the flange portion is at least 1.15 times the thickness of the pipe body portion.

3. The flanged pipe according to claim 1, wherein the minimum inner diameter of the bent portion is 0.7 to 0.95 times the inner diameter of the pipe body portion.

4. The flanged pipe according to claim 2, wherein the minimum inner diameter of the bent portion is 0.7 to 0.95 times the inner diameter of the pipe body portion.

5. The flanged pipe according to claim 1, wherein a maximum hardness of a top surface of the flange portion is at least 1.15 times a hardness of an outer surface of the pipe body portion.

6. The flanged pipe according to claim 1, wherein a width of the flange portion ranges from 40 mm to 120 mm.

7. The flanged pipe according to claim 6, wherein an outer diameter of the pipe body portion ranges from 60 mm to 400 mm, and the width of the flange portion ranges from 45 mm to 60 mm.

8. The flanged pipe according to claim 1, wherein the flange portion is disk-shaped or truncated-cone-shaped.

9. The flanged pipe according to claim 1, wherein the flange portion has at least two holes formed therethrough, each of said holes for receiving a bolt therein.

10. The flanged pipe according to claim 1, wherein the flange portion has a cut in a portion thereof that runs from an outer end of the flange portion up to the bent portion and is bent upward and downward at both sides of the cut.

11. The flanged pipe according to claim 1, wherein the flange portion is connected to a flange portion of an adjacent flanged pipe by at least one bolt, and each of the flange portions has at least one hole formed therethrough for receiving the at least one bolt.

12. The flanged pipe according to claim 1, wherein the flange portion is connected to a flange portion of an adjacent flanged pipe by at least one bolt, each of the flange portions has at least one hole formed therethrough for receiving the at least one bolt, and a packing is located between the flange portions to seal therebetween and form a water-tight structure.

13. The flanged pipe according to claim 1, wherein the flange portion is connected to a foundation by at least one bolt, the flange portion having at least one hole formed therethrough for receiving the at least one bolt.

14. A flanged metal pipe comprising:
a metal pipe body portion;
a flange portion; and
a bent portion located between the metal pipe body portion and the flange portion,
wherein the metal pipe body portion, the bent portion and the flange portion are formed from an integral, monolithic structure, a minimum inner diameter of the bent portion is 0.7 to 0.95 times an inner diameter of the metal pipe body portion, the flange portion has a first part having a thickness that is thicker than a thickness of the metal pipe body portion and a second part having a thickness that is thinner than the thickness of the metal pipe body portion, a maximum thickness of the flange portion is 1.15 to 2 times the thickness of the metal pipe body portion; and a maximum hardness of a top surface of the flange portion is 1.15 to 2 times a hardness of an outer surface of the metal pipe body portion.

15. The flanged metal pipe according to claim 14, wherein a width of the flange portion ranges from 40 mm to 120 mm.

16. The flanged metal pipe according to claim 15, wherein an outer diameter of the metal pipe body portion ranges from 60 mm to 400 mm, and the width of the flange portion ranges from 45 mm to 60 mm.

17. The flanged metal pipe according to claim 14, wherein the flange portion is disk-shaped or truncated-cone-shaped.

18. The flanged metal pipe according to claim 14, wherein the flange portion has at least two holes formed therethrough, each of said holes for receiving a bolt therein.

19. The flanged metal pipe according to claim 14, wherein the flange portion has a cut in a portion thereof that runs from an outer end of the flange portion up to the bent portion and is bent upward and downward at both sides of the cut.

20. The flanged metal pipe according to claim 14, wherein the flange portion is connected to a flange portion of an adjacent flanged pipe by at least one bolt, and each of the flange portions has at least one hole formed therethrough for receiving the at least one bolt.

21. The flanged metal pipe according to claim 14, wherein the flange portion is connected to a flange portion of an adjacent flanged pipe by at least one bolt, each of the flange portions has at least one hole formed therethrough for receiving the at least one bolt, and a packing is located between the flange portions to seal therebetween and form a water-tight structure.

22. The flanged metal pipe according to claim 14, wherein the flange portion is connected to a foundation by at least one bolt, the flange portion having at least one hole formed therethrough for receiving the at least one bolt.

* * * * *